United States Patent
Beverly et al.

(10) Patent No.: US 8,255,919 B2
(45) Date of Patent: Aug. 28, 2012

(54) DISTRIBUTED PROCESSING SYSTEM AND METHOD

(75) Inventors: Harlan T. Beverly, McDade, TX (US); Kumar Gala, Austin, TX (US); Charles A. Musta, Austin, TX (US)

(73) Assignee: Qualcomm Atheros, Inc., San Jose, CA (US)

( * ) Notice: Subject to any disclaimer, the term of this patent is extended or adjusted under 35 U.S.C. 154(b) by 1221 days.

(21) Appl. No.: 12/018,872

(22) Filed: Jan. 24, 2008

(65) Prior Publication Data

US 2008/0235713 A1 Sep. 25, 2008

Related U.S. Application Data

(60) Provisional application No. 60/896,834, filed on Mar. 23, 2007.

(51) Int. Cl.
G06F 9/46 (2006.01)
G06F 13/00 (2006.01)
G06F 15/00 (2006.01)

(52) U.S. Cl. .............................. 718/105; 719/328; 712/1

(58) Field of Classification Search .................. None
See application file for complete search history.

(56) References Cited

U.S. PATENT DOCUMENTS

| | | | |
|---|---|---|---|
| 5,155,858 A * | 10/1992 | DeBruler et al. ............. | 718/105 |
| 5,353,412 A | 10/1994 | Douglas et al. | |
| 5,355,371 A | 10/1994 | Auerbach et al. | |
| 5,675,736 A | 10/1997 | Brady et al. | |
| 5,771,287 A | 6/1998 | Gilley et al. | |
| 5,890,963 A | 4/1999 | Yen | |
| 5,923,893 A * | 7/1999 | Moyer et al. .................... | 712/38 |
| 6,015,348 A | 1/2000 | Lambright et al. | |
| 6,179,489 B1 | 1/2001 | So et al. | |
| 6,240,517 B1 | 5/2001 | Nishioka | |
| 6,615,218 B2 | 9/2003 | Mandal et al. | |
| 6,625,661 B1 | 9/2003 | Baldwin, Jr. | |
| 6,671,818 B1 | 12/2003 | Mikurak | |
| 6,735,773 B1 | 5/2004 | Trinh et al. | |
| 6,745,236 B1 | 6/2004 | Hawkins et al. | |
| 6,763,371 B1 | 7/2004 | Jandel | |
| 6,802,063 B1 | 10/2004 | Lee | |
| 6,810,528 B1 | 10/2004 | Chatani | |
| 6,908,389 B1 | 6/2005 | Puskala | |
| 6,918,042 B1 | 7/2005 | Debry | |
| 6,941,353 B1 | 9/2005 | Lane | |

(Continued)

FOREIGN PATENT DOCUMENTS

DE 10218795 11/2003

(Continued)

OTHER PUBLICATIONS

PCT International Search Report, May 23, 2008, 4 pages.

(Continued)

*Primary Examiner* — S. Sough
*Assistant Examiner* — Phuong Hoang
(74) *Attorney, Agent, or Firm* — DeLizio Gilliam, PLLC

(57) ABSTRACT

A method is disclosed that receives a function call at an application program interface. The method selects a first processor of a plurality of processors to execute the function call. The method further executes a first transmit function associated with a bus coupled to the first processor. The first transmit function includes a function parameter associated with the function call.

23 Claims, 9 Drawing Sheets

U.S. PATENT DOCUMENTS

| | | |
|---|---|---|
| 6,961,852 B2 | 11/2005 | Craft |
| 6,988,196 B2 | 1/2006 | Cromer et al. |
| 7,000,115 B2 | 2/2006 | Lewis et al. |
| 7,003,548 B1 | 2/2006 | Barck et al. |
| 7,046,680 B1 | 5/2006 | McDysan et al. |
| 7,065,756 B2 | 6/2006 | Barsness et al. |
| 7,139,780 B2 | 11/2006 | Lee et al. |
| 7,209,449 B2 | 4/2007 | Tang et al. |
| 7,249,109 B1 | 7/2007 | Silverbrook et al. |
| 7,274,702 B2 | 9/2007 | Toutant et al. |
| 2002/0078223 A1 | 6/2002 | Baldonado et al. |
| 2002/0107962 A1* | 8/2002 | Richter et al. ............... 709/225 |
| 2002/0180583 A1 | 12/2002 | Paatero et al. |
| 2002/0198932 A1 | 12/2002 | Wagner |
| 2003/0177187 A1 | 9/2003 | Levine et al. |
| 2003/0187914 A1* | 10/2003 | Kaniyar et al. ............... 709/201 |
| 2003/0191857 A1 | 10/2003 | Terrell et al. |
| 2004/0068580 A1 | 4/2004 | Jo et al. |
| 2004/0230801 A1 | 11/2004 | Sueyoshi et al. |
| 2004/0246905 A1 | 12/2004 | Dunagan et al. |
| 2005/0107161 A1 | 5/2005 | Fujimoto et al. |
| 2005/0188073 A1 | 8/2005 | Nakamichi et al. |
| 2006/0259579 A1 | 11/2006 | Beverly |
| 2006/0259632 A1 | 11/2006 | Crawford et al. |
| 2007/0005986 A1 | 1/2007 | Bernard et al. |
| 2007/0060373 A1 | 3/2007 | Beverly |
| 2007/0086343 A1 | 4/2007 | Kujawa et al. |
| 2007/0101408 A1 | 5/2007 | Nakhjiri |
| 2007/0189517 A1 | 8/2007 | Koseki et al. |
| 2007/0226498 A1 | 9/2007 | Walmsley et al. |
| 2007/0297405 A1 | 12/2007 | He |
| 2007/0298879 A1 | 12/2007 | Kobayashi et al. |
| 2008/0009337 A1 | 1/2008 | Jackson et al. |
| 2008/0009352 A1 | 1/2008 | Aoyama et al. |
| 2008/0010371 A1 | 1/2008 | Yamamoto et al. |
| 2008/0013551 A1 | 1/2008 | Scholl |
| 2008/0016236 A1 | 1/2008 | Beverly et al. |
| 2008/0022389 A1 | 1/2008 | Calcev et al. |
| 2008/0039208 A1 | 2/2008 | Abrink et al. |
| 2008/0045285 A1 | 2/2008 | Fujito |
| 2008/0049621 A1 | 2/2008 | McGuire et al. |

FOREIGN PATENT DOCUMENTS

| | | |
|---|---|---|
| JP | 10314451 | 12/1998 |
| JP | 2001246147 | 9/2001 |
| WO | 97/28623 A2 | 8/1997 |

OTHER PUBLICATIONS

EP Search Report for EP 08 72 8180 dated Feb. 23, 2010, 6 pages.

PCT Search Report, May 23, 2008, 10 pages.

* cited by examiner

DISTRIBUTED PROCESSING SYSTEM AND METHOD

CROSS REFERENCE TO RELATED APPLICATIONS

This application claims priority to U.S. Provisional Patent Application No. 60/896,834, entitled "METHOD AND SYSTEM FOR EFFICIENT PROCESSOR TO PROCESSOR COMMUNICATION AND WORK SHARING ACROSS A BUS," filed on Mar. 23, 2007, which is assigned to the current assignee hereof and is incorporated herein by reference in its entirety.

FIELD OF THE INVENTION

The present disclosure relates generally to data processing systems, and more particularly to systems having multiple data processors that communicate across a bus.

BACKGROUND

Today's data processing systems can employ multiple processors to perform tasks. For example a general purpose processor can be employed to execute general purpose tasks based on instructions provided by a computer program. Other processors in the system can be dedicated to particular tasks. For example, a processor in a network card can be dedicated to perform tasks related to communication with a computer network. Further, in some systems the processors can communicate via a bus to perform more complex tasks. Thus, the general purpose processor can communicate with the network processor in order to send or receive communications via the computer network.

The tasks performed by data processing systems have grown and continue to grow in complexity in recent years. Such complex tasks can be difficult for conventional data processing systems to execute in a desirable amount of time. One method of addressing the increasing complexity of data processing tasks is to increase the complexity of the data processors in the system. However, designing and implementing a complex data processor can be expensive and undesirably time-consuming. Accordingly, an improved method and system for performing data processing tasks would by useful.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION

Embodiments discussed below describe, in part, distributed computing solutions that manage all or part of a function call from an application program interface (API). In this context, a function call can be any request from the API that a processor execute a particular function. The function can be in one or more of a variety of function categories, such as mathematical functions, data storage and retrieval functions, network and communication functions, graphical processing functions, and the like. Further, a processor can be a general purpose data processor, an application specific integrated circuit, and the like.

Whatever the function and the type of processors being used, implementation of the function call can be selectively performed at any processor. In particular, a fork program can receive the function call from the API, and determine which of the processors should execute the function. This determination can be based on a number of factors, including relative processor load, efficiency of each processor in executing a particular function type, and the like. In the event that the fork program determines that the function call should be executed by a remote processor (i.e. a processor different from the processor executing the fork program), the program provides the function call to the remote processor, as described further herein. The fork program can also receive returned results from the function call, and provide the results to the API.

Figure 1:
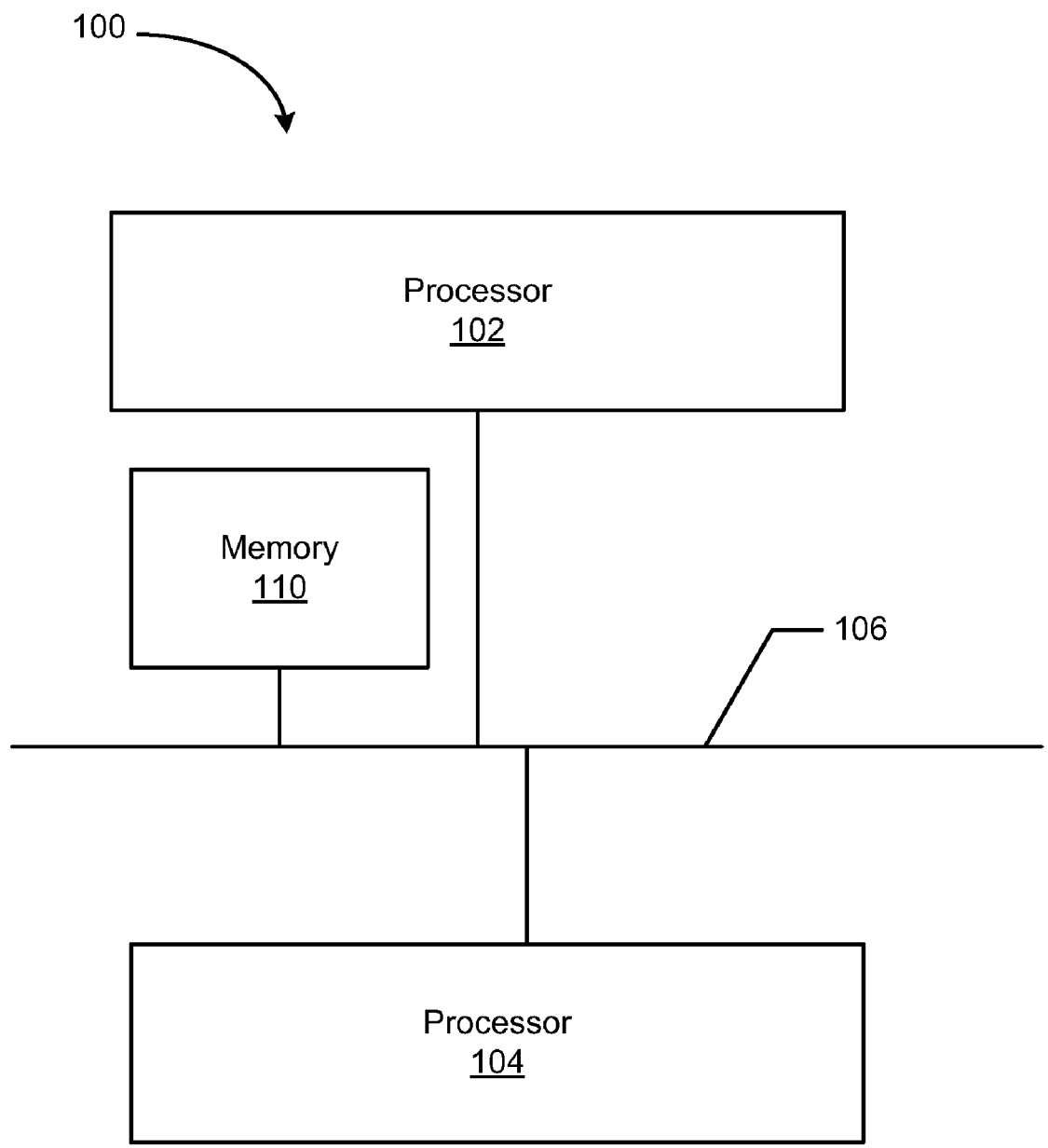
FIG. 1 is a block diagram of a particular embodiment of a data processing system.

As indicated above, this application claims priority to U.S. Provisional Patent Application No. 60/679,904, filed on Jan. 26, 2007. The provisional application describes in part specific implementations of the teachings disclosed herein and is not intended to limit the scope of the claims attached below. The entirety of both provisional applications is incorporated herein by reference As mentioned above, FIG. 1 is a block diagram of a particular embodiment of a data processing system 100, including a processor 102, a processor 104 and memory 110, each connected to a bus 104. Each of the processors 102 and 104 can be manipulated by instructions of a computer program storied at the memory 110 to perform system tasks. The memory 110 is a computer readable medium such as random access memory (RAM), a hard disk, or flash memory.

The processors 102 and 104 can communicate via the bus 106. The bus 106 can be one of a variety of busses, including a PCI, PCI-E, PCI-X, SCSI, USB, IDE, ATA, SerialATA, Infiniband, Ethernet, or other kind of bus.

In an embodiment, the processors 102 and 104 can have different architectures, thus requiring different instruction formats and implementations at each processor. Further, the processors 102 and 104 can each be designated for particular tasks. Thus, the processor 102 can be a general purpose processor, while the processor 104 is generally designated for network tasks. As used herein, the term "generally designated" indicates that the primary function of the processor is to perform a particular type of task, but can also be used to execute function calls for other task types. Accordingly, in an embodiment, the processor 102 is a general purpose processor for a computer device, such as a desktop computer or laptop, while the processor 104 is a processor for a network device, such as network card, generally designated to process communications to and from a network (not shown), such as wide-area or local area network. Further, it will be appreciated that in other embodiments the processors 102 and 104 are both general purpose processors, and are not specially designated for particular tasks.

In operation, one or both of the processors 102 execute an application program interface (API). As used herein, the term API refers to an interface between an operating system and applications executing at the data processing system 100. For purposes of discussion, it will be assumed that the application program and the API are executed at the processor 102. However, it will be appreciated that the API and application programs could also be executed at both the processor 102 and the processor 104.

To request a particular function be performed, the application program issues a function call to the API. As described further herein, the API can include a fork program to determine which processor should execute the function call. This determination can be made based on a number of criteria, including the relative processing load for each processor, the complexity of the function call, and the like.

Figure 2:
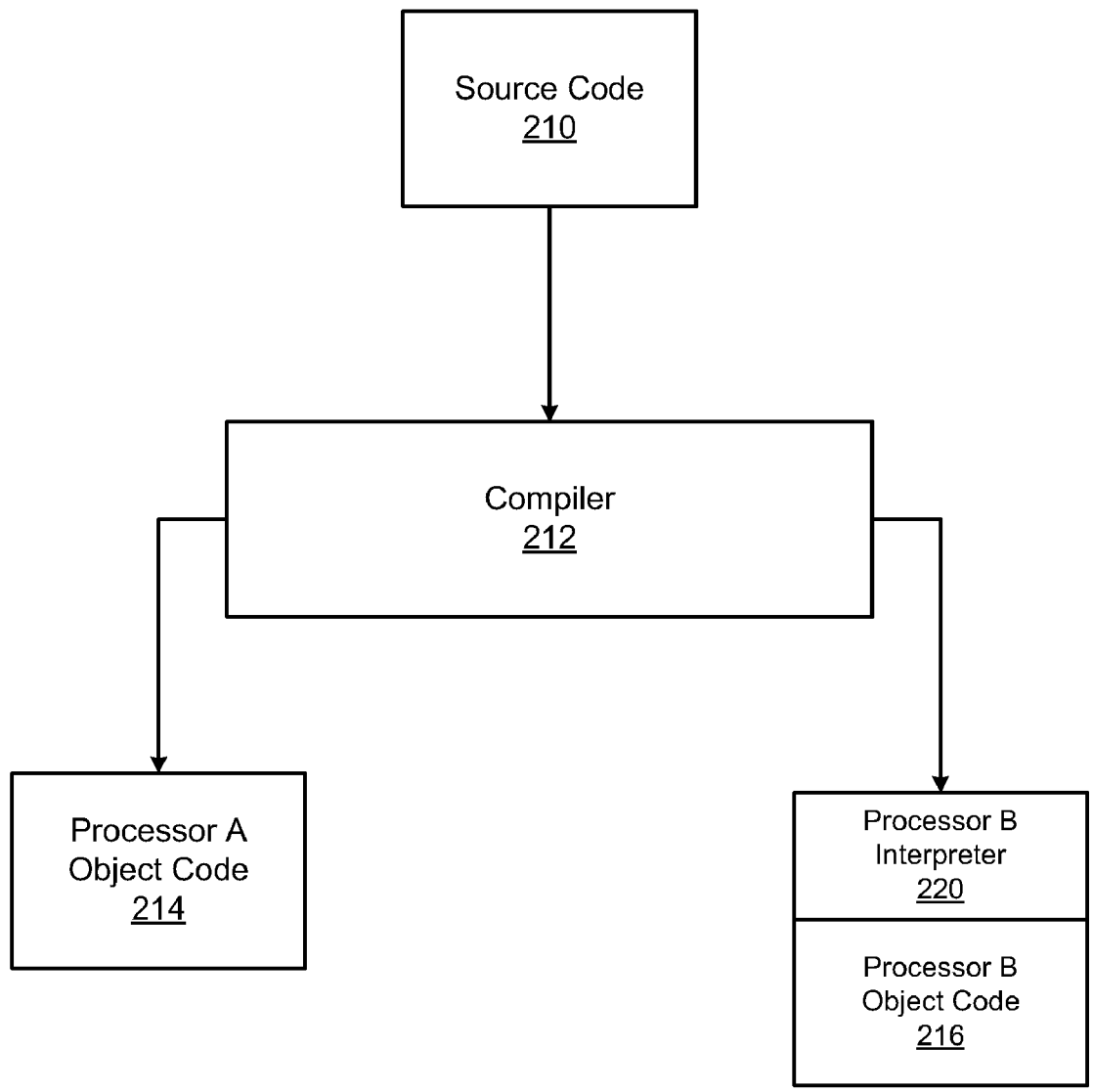
FIG. 2 is a flow diagram of a particular embodiment of a method of creating object code for a data processing system.

Each of the processors 102 and 104 include object code to execute particular function calls. This can be better understood with reference to FIGS. 2 and 3. FIG. 2 illustrates a flow diagram of a particular embodiment of a method 200 of creating object code for multiple processors. The method 200 includes source code 210. The source code 210 includes instructions to perform a particular function, such as an arithmetic function, a data manipulation function, and the like. The method 200 also includes a compiler 212. The compiler 212 translates the source code 210 to object code for different processors, referred to in the illustrated example as "Processor A" and "Processor B." As indicated above, each processor can have its own instruction set, so that the object code to perform a particular function will be different for each processor. Accordingly, the compiler 212 translates the source code 210 to object code 214 for Processor A and to object code 216 for Processor B.

In addition, the compiler 212 also creates interpreter 220. The interpreter 220 is configured to translate function calls for processor A to an appropriate format so that the call can be executed by the object code 216. Accordingly, an API executing at processor A can receive a function call intended for processor A and provide the call to Processor B. In that case, the interpreter 220 translates the function call to an appropriate format, and the object code 216 executes the called function. Thus, the function call can be executed at either processor without revision of the API or the original function call.

Figure 3:
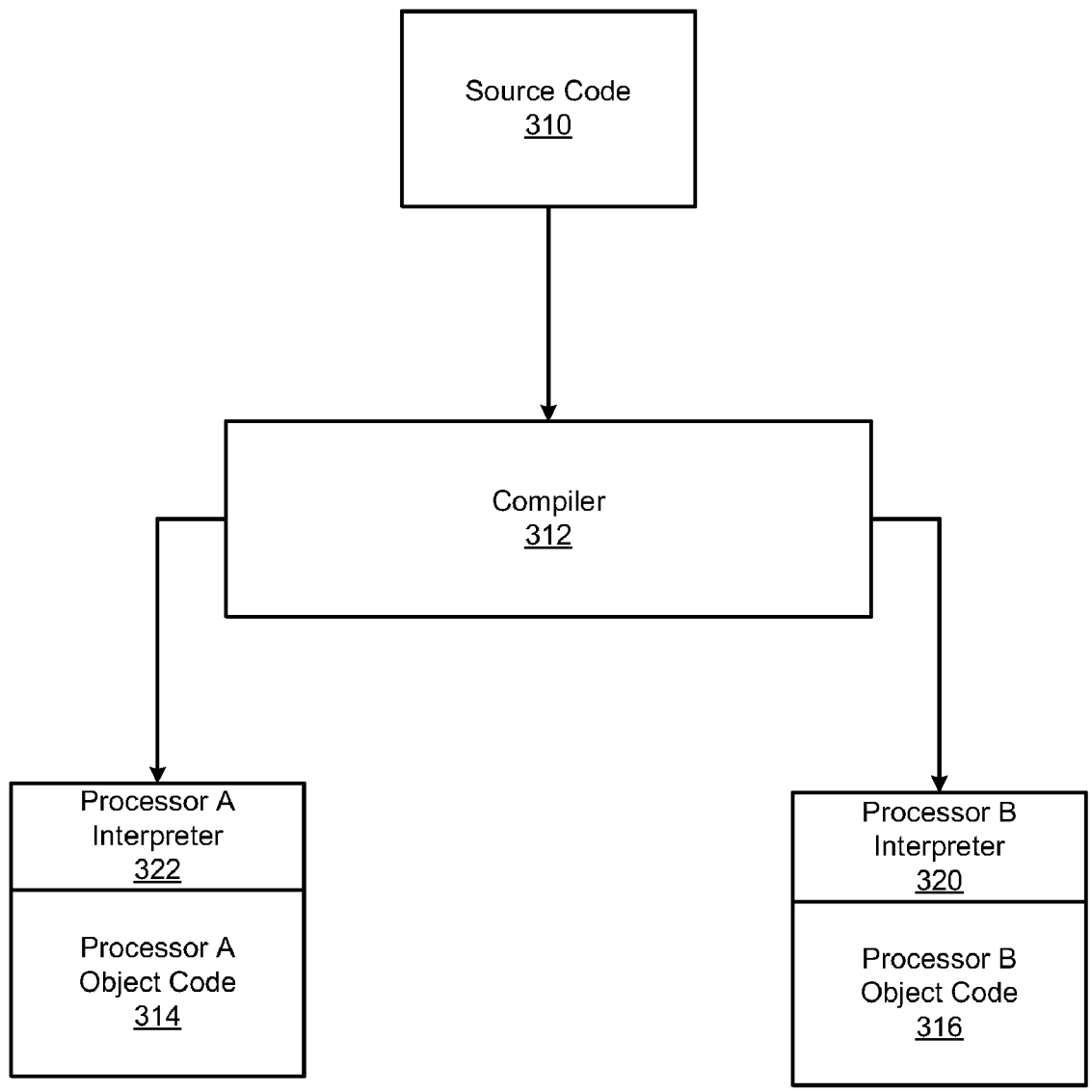
FIG. 3 is a flow diagram of an alternative embodiment of a method of creating object code for a data processing system.

FIG. 3 illustrates a particular embodiment of a method 300 for creating object code for multiple processors. As in FIG. 2, the method 300 includes source code 310 that is translated by a compiler 312 to object code 314, for execution at Processor A, and object code 316, for execution at processor B. However, in the illustrated example of FIG. 3, the compiler 312 also creates an interpreter 322, for Processor A, and an interpreter 320, for Processor B. Each of the interpreters 320 and 322 translate a function call to the appropriate format for execution by the object code 316 and 314, respectively. Thus, the method 300 allows for a single function call to be executed at either processor A or processor B without redesign of the API or the function call.

Referring again to FIG. 1, the processors 102 and 104 each include object code to execute particular function calls, together with interpreters for that object code. Accordingly, as the API receives function calls, the API can route the function call to either of the processors 102 or 104 for execution. This can be better understood with reference to FIG. 4.

Figure 4:
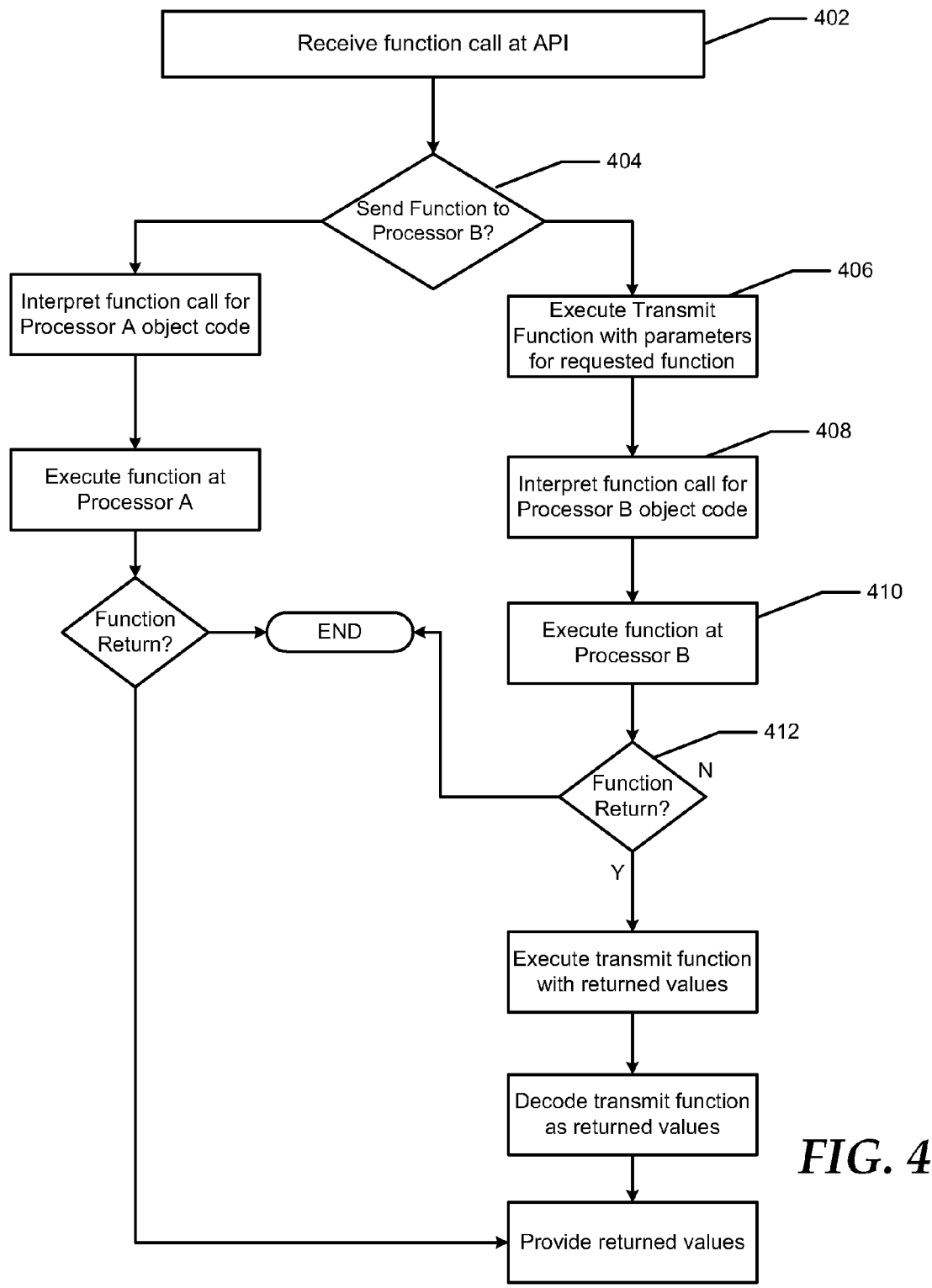
FIG. 4 is a flow diagram of a particular embodiment of a method of executing a function call at a data processing system.

FIG. 4 illustrates a flow diagram of a particular embodiment of a method 400 for executing a function call. At block 402, the API determines that it has received a function call. At block 404, the API determines whether the function call should be executed at Processor B. In the illustrated example of FIG. 4, it is assumed that the API and the application that initiated the function call are executing at Processor A, and that Processor B is connected to Processor A via a bus.

If, at block 404, the API determines that the called function should be executed at Processor A, the method flows to block 430, and an interpreter program at Processor A (e.g. interpreter program 322 of FIG. 3) translates the function call to an appropriate format for the object code to execute the function. At block 432, the object code executes the function based on the translated function call. At block 434, the object code determines whether the function is required to return one or more values to the API. For example, if the called function is a mathematical function, the object code can return the results of the function to the API. If it is determined at block 434 that no return values are required, the method flow moves to block 450 and the method ends. If it is determined at block 434 that the called function requires returned values, the method flow moves to block 418 and the returned values are provided to the API. In an embodiment, the interpreter program can translate the returned values to the appropriate format for the API.

Returning to block 404, if it is determined that the function call should be executed at Processor B, the method flow moves to block 406, and the API makes a transmit function call to send the requested function call to Processor B. The requested function is provided as parameters of the transmit function call. The transmit function call is a function call associated with the bus that transmits the parameters. In an embodiment, the transmit function call is a function call of a type that can be used to pass data or control information to Processor B in order for the processor to execute tasks other than execution of function calls. For example, in an embodiment Processor B is a processor of a network card that can communicate information via a network, such as a local or wide-area network (e.g. the Internet). Accordingly, processor A can use the transmit function call to transfer data to processor B for communication via the network. Thus, the transmit function referred to at block 406 can be used to transfer both function calls from the API and also used to transfer data for communication over the network.

At block 408, an interpreter program at Processor B (e.g. interpreter program 320 of FIG. 3) determines that the parameters of the transmit function are a function call. Accordingly, the interpreter program translates the requested function call to an appropriate format for object code at Processor B.

At block 410, the object code executes the requested function. At block 412, it is determined whether the requested function requires one or more returned values. If not, the method flow moves to block 450 and the method ends. If returned values are required, the method flow proceeds to block 414, and the interpreter program executes a transmit function to send the return values to Processor A. In an embodiment, the transmit function used at block 414 can be a function used to transfer data other than data returned from a function call from Processor B to Processor A. For example, in an embodiment Processor B is a processor generally designated to control communications between Processor A and a network. To send data received from the network to Processor A, Processor B executes a receive function. Accordingly, Processor B can use the same receive function to transfer return values from a function call to Processor A.

At block 416, an interpreter program at Processor A, or the API, determines that whether the values transmitted via the transmit function are returned values from the previous function call, rather than other data. Accordingly, the values are decoded at block 416 and provided to the API at block 418. Thus, in the illustrated embodiment, function calls can be executed by selecting one of a number of processors and executing the function call at the selected processor. This allows programs to be executed by multiple processors, improving efficiency of the data processing system. Further, the function calls can be transferred from to the selected processor over the bus using transfer function calls that, in other contexts, are used to communicate data or control information to the selected processor. This allows the function call to be transferred without creating a specialized transfer function, simplifying communication. In addition, values returned from a function executed at the selected processor can be communicated to another processor using a transfer function call otherwise used to transfer ordinary data or other information to the processor. This obviates the need for a special function call to transfer the returned values.

Figure 5:
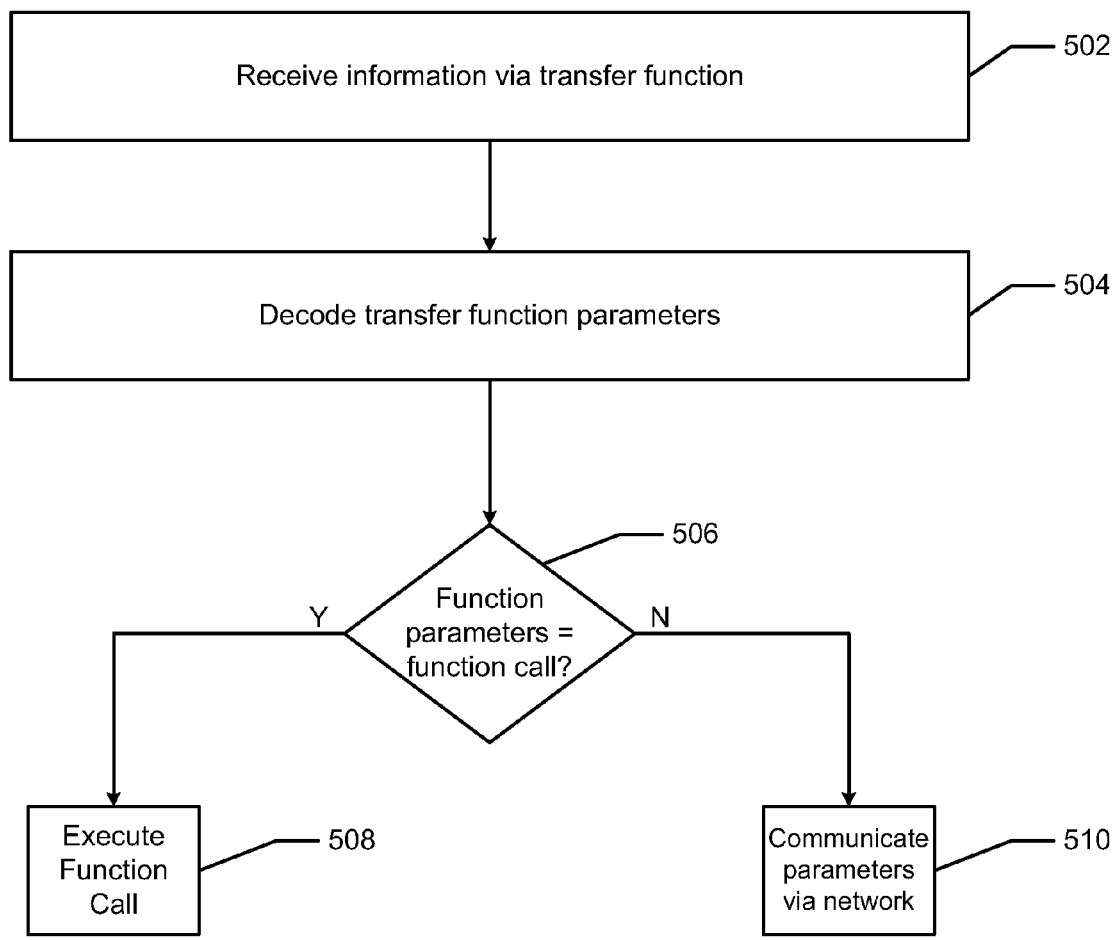
FIG. 5 is a flow diagram of a method of receiving a function call at a processor.

FIG. 5 illustrates a flow diagram of a particular embodiment of a method of transferring information from one processor to another across a bus. At block 502, parameters of a transfer function initiated at a first processor are received at a second processor. In the illustrated embodiment, the second processor is associated with executing network functions, including communication of data received from the first processor to a network. At block 504, the second processor decodes the transfer function parameters, and at block 506 the second processor determines whether the received transfer function parameters are a function call received from an API at the first processor. If so, the method flow proceeds to block 508, and the second processor executes the function call. If the transfer function parameters are not a function call, this indicates the parameters are data to be communicated via the network. Accordingly, the method flow moves to block 510 and the second processor communicates data based on the received parameters via the network.

Figure 6:
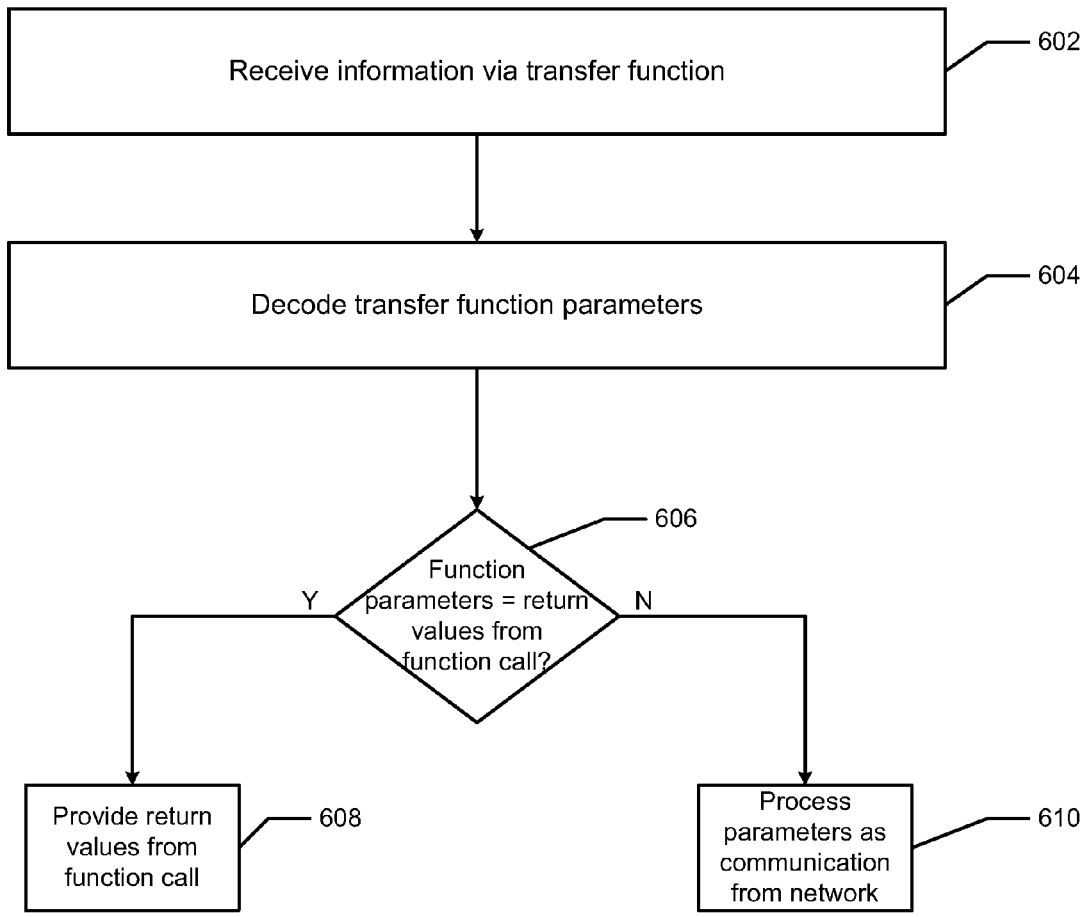
FIG. 6 is a flow diagram of a method of receiving return values of a function call at a processor.

FIG. 6 illustrates a flow diagram of a particular embodiment of a method of transferring return values from one processor to another across a bus. At block 602, a first processor receives parameters of a transfer function executed at a second processor. In the illustrated embodiment, the second processor is associated with executing network functions, including communication of data received from a network to the first processor. At block 604, the first processor decodes the transfer function parameters, and at block 606 the second processor determines whether the received transfer function parameters represent return values from a function call provided by the first processor to the second processor for execution. If so, the method flow proceeds to block 608, and the first processor communicates the return data to the API that issued the function call. If the transfer function parameters are not return values of a function call, this indicates the parameters are data communicated from the network. Accordingly, the method flow moves to block 610 and the first processor processes the parameters as communications. For example, the first processor can place the received communications on a network stack.

Figure 7:
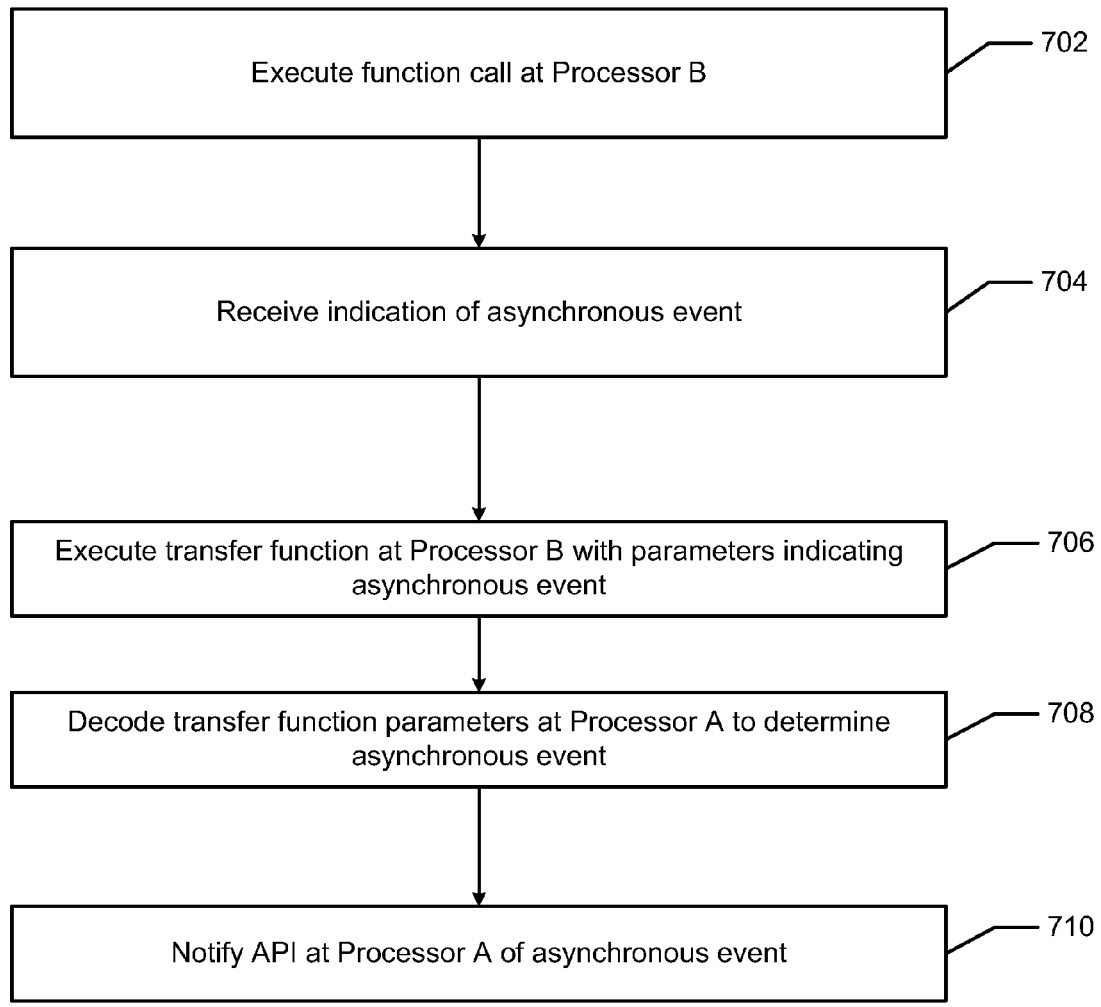
FIG. 7 is a flow diagram of a method of providing notification of an asynchronous event at a processor.

Referring to FIG. 7, a flow diagram of a particular embodiment of a method of communicating notification of an asynchronous event from one processor to another is illustrated. At block 702, a function call is executed at a processor, labeled Processor B. The function call was previously received from another processor, labeled Processor A, as described above with respect to FIGS. 1-5. In the illustrated embodiment of FIG. 7, the function call executed at Processor A is a function call associated with an asynchronous event. For example, the function call can be a request from an API at Processor A to notify the API when a particular event has taken place, such as when data received from a network. The asynchronous event is asynchronous with respect to issuance of the function call, so that the timing of the notification is uncertain relative to when the function call was issued from the API.

At block 704, Processor B receives an indication that the asynchronous event associated with the function call is received at Processor B. At block 706, Processor B calls a transfer function with an indication of the asynchronous event as parameters of the function. This transfers the indication across a bus to Processor A.

At block 708, Processor A decodes the received parameters from the transfer function call Processor B and determines that the received parameters are indicative of an asynchronous event associated with a previous function call requested by an API at processor A. Accordingly, at block 710, Processor A provides an indication to the API of the asynchronous event.

Figure 8:
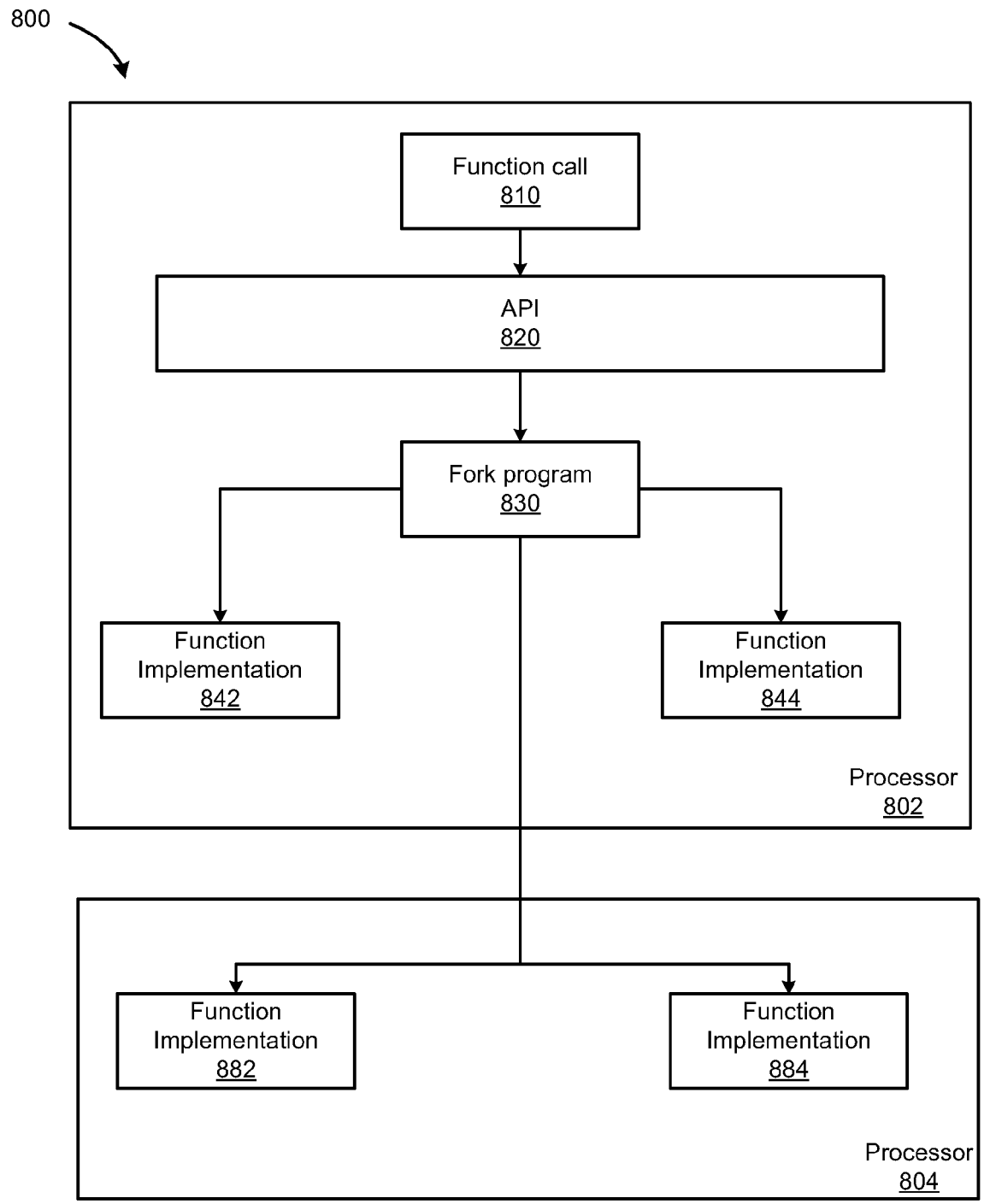
FIG. 8 is a block diagram illustrating a particular embodiment of a method of selecting a function implementation to execute a function call.

Referring to FIG. 8, a block diagram illustrating a method 800 of selecting a function implementation to execute a function call. As illustrated, a function call 810 is received at an application program interface (API) 820 executing at processor 802. The API 820 provides the function call 802 to a fork program 830. In response, the fork program 830 selects from a number of function implementations to execute the function call, including function implementations 842 and 844, which are function implementations that can be executed at processor 802, and function implementations 882 and 884, which are function implementations that can be executed at processor 804. In the event that the fork program 830 selects one of the function implementations 882 or 884 to execute the function call 810, the function call can be transmitted to the processor 802 via a transmit function call, as described above. Further, it will be appreciated that each of the function implementations 842, 844, 882, and 884 represent object code for execution of the function call 810, and each function implementation can include an interpretation program to translate the function call to an appropriate format for execution by the implementation.

The fork program 830 can select one of the function implementations based on a number of criteria, or combination thereof. For example, in an embodiment the fork program 830 can determine a processor load for each of the processors 802 and 804 and select a function implementation based on this determination. In another embodiment, the fork program 830 can select one of the function implementations based on availability of a bus connecting the processors 802 and 804.

In still another embodiment, the fork program 830 can select the function implementation based on the latency of each implementation. As used herein, latency refers to the speed at which a function implementation will return a value based on the function call 810. In another embodiment, the fork program 830 can select the function implementation based on the bandwidth for each implementation. As used herein, bandwidth refers to the amount of parallel processing an implementation can perform to execute the function call 810.

The fork program 830 can also select the function implementation based on availability of resources, such as memory or cache resources associated with each of the processors 802 and 804. For example, in an embodiment, the processors 802 can each be associated with a different cache. The fork program 830 can select a function implementation based on the availability of cache space, the speed of each cache, or other cache features.

In another embodiment, the processors 802 and 804 can each be executing a different operating system, and the fork program 830 can select a function implementation based on the operating system executing at a particular processor. In still another embodiment, the fork program 830 can select the function implementation based on the presence of specialized hardware at or controlled by one of the processors 802 and 804.

It will be appreciated that the fork program 830 can select a function implementation based on any combination of criteria listed above, based on other criteria, or any combination thereof. In addition, the fork program 830 can also be configured to detect whether processor 804 is present, and select a function implementation based on the presence or absence of processor 804.

Figure 9:
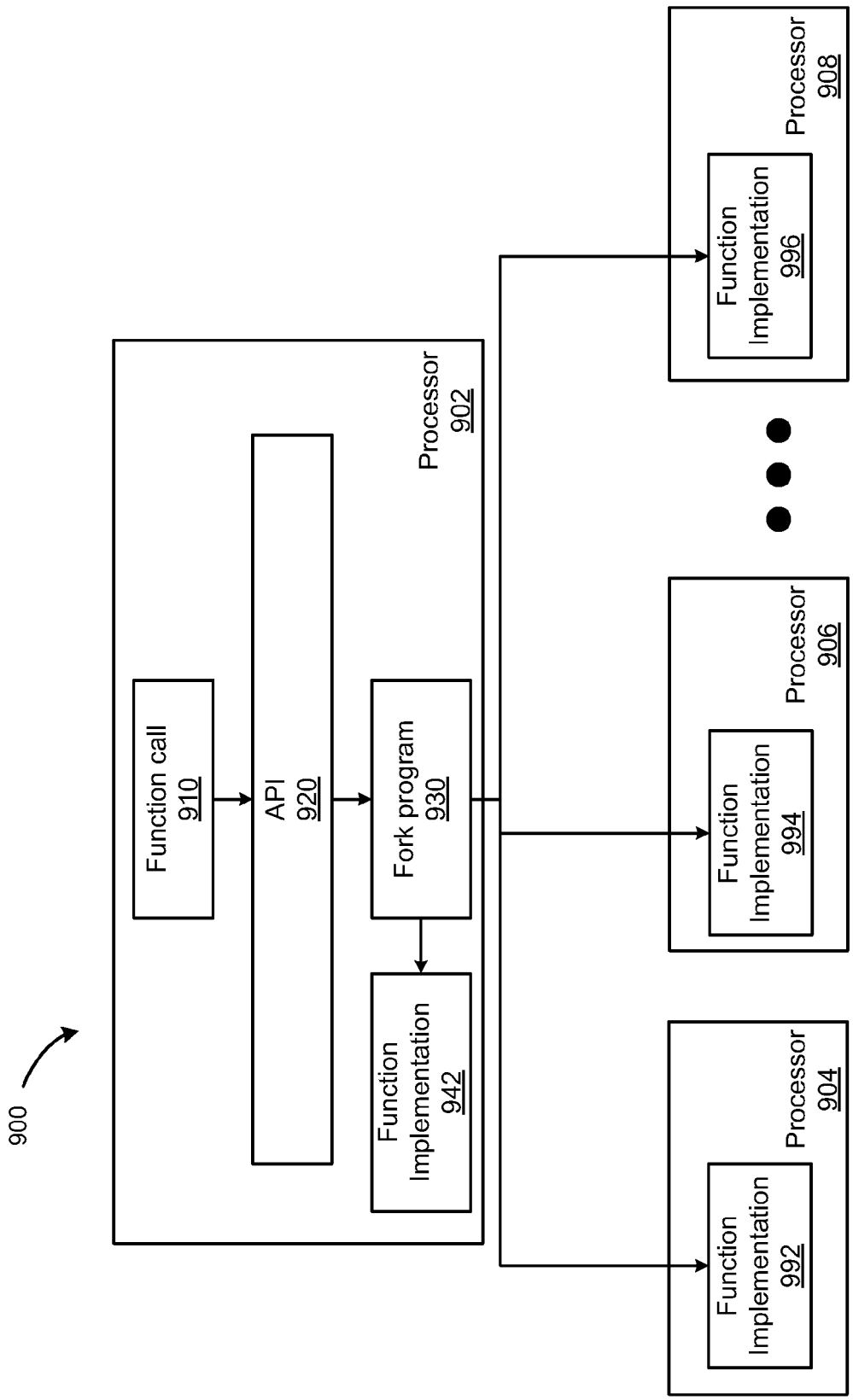
FIG. 9 is a block diagram illustrating a particular embodiment of a method of selecting a function implementation at one of N processors to execute a function call.

Referring to FIG. 9, a block diagram illustrating a particular embodiment of a method 900 of selecting a function implementation at one of N processors is illustrated. As illustrated the method 900 includes N processors, including processor 902, 904, 906, through Nth processor 908. Each of the N processors includes a function implementation including object code to execute function call 910. Thus, processor 902 includes function implementation 942, processor 904 includes function implementation 992, processor 906 includes function call 994, and Nth processor 908 includes function call 996. Each of the function implementations can include an interpretation program to translate the function call 910 to a format that can be executed at the associated processor. In addition, it will be appreciated that although for purposes of discussion each of the processors 902-908 are illustrated as implementing one function implementation, in other embodiments one or more of the processors could implement multiple function implementations, as described above with respect to FIG. 8.

In operation, and application program interface 920 receives the function call 910 and provides it to a fork program 930. The fork program 930 determines which of the function implementations should execute the function call 910. If the fork program 930 determines that one of the function implementations at processors 904-908 should execute the function call, it creates a transmit function call using the function call 910 as a parameter. In an embodiment, the transmit function call can be uniquely associated with the processor to which the function call 910 is being transmitted. Further, the transmit function call can be of a type associated with transfer of data for a purpose other than execution of a function call. Thus, for example, the processor 904 can be a processor associated with a network card, while processor 906 is associated with a graphics card. Accordingly, the transmit function used to transmit the function call 910 to the processor 904 can be a transmit function associated with communicating data via a network, while the transmit function used to transmit the function call 910 to the processor 906 can be a transmit function associated with communicating graphics data or graphics control information. Thus, the function call 910 can be transmitted using a function call that is already in place to transmit other information, allowing the transmission of function calls to be performed without creating additional transmission overhead.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   receiving a function call at an application program interface;
   selecting a first processor of a plurality of processors to execute the function call;
   executing a first transmit function associated with a bus coupled to the first processor, the first transmit function including a function parameter associated with the function call, the first transmit function of a function type associated with transmitting data to the first processor for a function other than execution of the function call;
   receiving first information from the first processor based on a second transmit function associated with the bus;
   determining that the first information is representative of returned values associated with the first function call; and
   communicating the first information to the application program interface.

2. The method of claim 1, wherein the first transmit function of the function type associated with transmitting data to the first processor comprises the first transmit function of the function type associated with said transmitting data to the first processor of a network interface device for communication via a network.

3. The method of claim 1, wherein the second transmit function is of a function type associated with transmitting data received from a network to a second processor.

4. The method of claim 1, wherein receiving the function call comprises receiving the function call at the application program interface executing at a second processor of the plurality of processors.

5. The method of claim 1, wherein selecting the first processor comprises selecting the first processor based on a relative processor load of the plurality of processors.

6. The method of claim 1, wherein selecting the first processor comprises selecting the first processor based on the function type of the function call.

7. The method of claim 1, wherein selecting the first processor comprises selecting the first processor based on a type of the first processor.

8. The method of claim 1, wherein selecting the first processor comprises selecting the first processor based on an availability of the bus.

9. The method of claim 1, wherein selecting the first processor comprises selecting the first processor based on a latency associated with execution of the function call at the first processor.

10. The method of claim 1, wherein selecting the first processor comprises selecting the first processor based on a bandwidth associated with execution of the function call at the first processor.

11. One or more computer readable storage media having instructions stored therein, which when executed by one or more processors causes the one or more processors to perform operations that comprise:
    receiving a function call at an application program interface;
    selecting a first processor of a plurality of processors to execute the function call;
    executing a first transmit function associated with a bus coupled to the first processor, the first transmit function including a function parameter associated with the function call, the transmit function of a function type associated with transmitting data to the first processor for a function other than execution of the function call;
receiving first information from the first processor based on a second transmit function associated with the bus;
determining that the first information is representative of returned values associated with the first function call; and
communicating the first information to the application program interface.

12. The computer readable storage media of claim 11, wherein the transmit function of the function type associated with said transmitting data to the first processor of a network interface device for communication via a network.

13. The computer readable storage media of claim 11, wherein the second transmit function is of a function type associated with transmitting data received from a network to a second processor.

14. The computer readable storage media of claim 11, wherein receiving the function call comprises receiving the function call at the application program interface executing at a second processor of the plurality of processors.

15. An apparatus, comprising:
a first processor; and
a second processor coupled with the first processor via a bus, the second processor operable to execute an application program interface, the second processor further operable to:
    receive a function call at the application program interface;
    select the first processor to execute the function call;
    execute a first transmit function associated with the bus coupled to the first processor, the first transmit function including a function parameter associated with the function call, the first transmit function of a function type associated with transmitting data to the first processor for a function other than execution of the function call;
    receive first information from the first processor based on a second transmit function associated with the bus;
    determine that the first information is representative of returned values associated with the first function call; and
    communicate the first information to the application program interface.

16. The apparatus of claim 15, wherein the second processor operable to execute the first transmit function of the function type associated with transmitting data to the first processor comprises the second processor operable to execute the first transmit function of the function type associated with said transmitting data to the first processor of a network interface device for communication via a network.

17. The apparatus of claim 15, wherein the second transmit function is of a function type associated with transmitting data received from a network to the second processor.

18. The apparatus of claim 15, wherein the second processor operable to select the first processor comprises the second processor operable to select the first processor from a plurality of processors based on a relative processor load of the plurality of processors.

19. The apparatus of claim 15, wherein the second processor operable to select the first processor comprises the second processor operable to select the first processor from a plurality of processors based on the function type of the function call.

20. The apparatus of claim 15, wherein the second processor operable to select the first processor comprises the second processor operable to select the first processor from a plurality of processors based on a type of the first processor.

21. The apparatus of claim 15, wherein the second processor operable to select the first processor comprises the second processor operable to select the first processor from a plurality of processors based on an availability of the bus.

22. The apparatus of claim 15, wherein the second processor operable to select the first processor comprises the second processor operable to select the first processor from a plurality of processors based on a latency associated with execution of the function call at the first processor.

23. The apparatus of claim 15, wherein the second processor operable to select the first processor comprises the second processor operable to select the first processor from a plurality of processors based on a bandwidth associated with execution of the function call at the first processor.

* * * * *